(12) United States Patent
Pomianowski et al.

(10) Patent No.: US 9,299,125 B2
(45) Date of Patent: Mar. 29, 2016

(54) VARIABLE ACUITY RENDERING USING MULTISAMPLE ANTI-ALIASING

(71) Applicant: Advanced Micro Devices Inc., Sunnyvale, CA (US)

(72) Inventors: Andrew S Pomianowski, Sunnyvale, CA (US); Raja Koduri, Saratoga, CA (US); Jason Yang, Sunnyvale, CA (US); Angus M Dorbie, Redwood City, CA (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 349 days.

(21) Appl. No.: 13/887,092

(22) Filed: May 3, 2013

(65) Prior Publication Data

US 2014/0327696 A1  Nov. 6, 2014

(51) Int. Cl.
*G06K 9/40* (2006.01)
*G09G 5/00* (2006.01)
*G06T 1/60* (2006.01)
*G06T 11/40* (2006.01)

(52) U.S. Cl.
CPC .. *G06T 1/60* (2013.01); *G06T 11/40* (2013.01)

(58) Field of Classification Search
CPC .............. G06T 11/203; G06T 5/001; G09G 2340/0407

USPC .................................. 345/611, 698; 382/269
See application file for complete search history.

(56) References Cited

U.S. PATENT DOCUMENTS

| | | | |
|---|---|---|---|
| 4,342,914 A * | 8/1982 | Bjorkholm | 378/113 |
| 5,214,753 A * | 5/1993 | Lee et al. | 345/610 |
| 6,614,445 B1 | 9/2003 | Dorbie | |
| 6,720,975 B1 * | 4/2004 | Dietrich, Jr. | 345/611 |
| 8,233,004 B1 * | 7/2012 | Molnar et al. | 345/581 |
| 2005/0041037 A1 * | 2/2005 | Dawson | 345/611 |
| 2009/0256848 A1 | 10/2009 | Iourcha et al. | |
| 2009/0295811 A1 * | 12/2009 | Falchetto et al. | 345/502 |

* cited by examiner

*Primary Examiner* — Phi Hoang
*Assistant Examiner* — Yi Yang
(74) *Attorney, Agent, or Firm* — Staniford Tomita LLP

(57) ABSTRACT

Embodiments are described for a method for using anti-aliasing hardware to generate a higher resolution image at the processing of a lower resolution image with anti-aliasing. A graphics image comprising allocating a buffer used in a multisample anti-aliasing process, wherein the allocated buffer has a dimension comprising a reduction in at least one of the width or height of an original dimension of an original buffer provided by the anti-aliasing hardware; rendering sampled image data to the allocated buffer at a sampling rate proportional to the reduction; and expanding the allocated buffer back to the dimension of the original buffer.

16 Claims, 5 Drawing Sheets

VARIABLE ACUITY RENDERING USING MULTISAMPLE ANTI-ALIASING

TECHNICAL FIELD

One or more implementations relate generally to computer graphics, and more specifically to efficient generation of high resolution images using anti-aliasing hardware.

BACKGROUND

Modern graphics hardware commonly use anti-aliasing techniques to minimize or smooth out aliasing artifacts that are often manifested as the jagged appearance of edges on image objects. One method of anti-aliasing is supersampling, which generates an image at sub-pixel resolution and averages the color intensity on each pixel region. The multiple color samples within the image are averaged out or downsampled. Multisample anti-aliasing (MSAA) is a special case of supersampling, which renders as much of the scene as possible without using anti-aliasing, but processes extra samples of the pixels on the edge of the object where aliasing artifacts are typically more pronounced. MSAA represents an optimization of supersampling in that the renderer evaluates the fragment sample once per pixel and only supersamples certain components of the final image. Additionally only some fragments undergo this partial supersampling and the resulting pixel storage may represent a complex multi-sampled pixel or a single sampled pixel. MSAA is typically used in real-time rendering solutions to avoid the overhead imposed by supersampling, which is more costly due to performing multiple shading operations for every pixel in the image regardless of the contents of the image.

The advent of high-resolution displays (e.g. Eyefinity systems with multiple monitors, or Retina® displays on low power devices) incur a very high cost for pixel processing (e.g., shading or coloring) due to the very large number of screen pixels. This cost may be out of proportion to the performance capabilities of the graphics rendering device. For example, shading operations can be very costly for each pixel since they typically require a large amount of power in terms of both processing and energy cost. The new high-resolution displays generally have a pixel density that is high enough (e.g., on the order of about 300 or more pixels per inch) that some claim a person is unable to discern the individual pixels at a normal viewing distance. To address the challenges posed by such displays, present solutions typically involve rendering at a reduced resolution and then upscaling to a final target or native display resolution. Such solutions are often undesirable, however, due to the introduction of scaling artifacts, and other distortion effects. Though an upscaling filter can be used to help alleviate these problems, such filters are typically quite complicated and can incur a high cost to produce reasonable image quality.

The demands of increasing display resolution in new high-resolution displays also requires increased pixel fill. As these displays push resolution beyond perceptible levels in many portions of the display, they create the added need to perform pixel fill uniformly over the entire display area to meet minimum resolution requirements.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Some embodiments are directed to an anti-aliasing method that comprises allocating a buffer used in a multisample anti-aliasing process, wherein the allocated buffer comprises a reduction in at least one of the width or height of an original dimension of an existing buffer or area in memory; rendering multi-sampled image data to the portion of the allocated buffer at a sampling rate that is based on the reduction; and expanding the portion of the allocated buffer back to the original dimension. The expansion of the allocated buffer back to the original dimension may comprise a shading operation performed by a shader unit of a graphics processing circuit implementing the anti-aliasing method, and may further comprise applying a filter function on one or more internal pixels to generate interpolated values for the internal pixels in the rendered image.

Some embodiments are further directed to a method or apparatus for anti-aliasing a graphics image, comprising: identifying an edge portion of the graphics image comprising edge pixels that are distinct from internal pixels comprising an internal portion of the graphics image; performing a rendering operation of the edge pixels at a full resolution of a graphics pipeline rendering the graphics image; and performing the rendering operation of the internal pixels at a fraction of the full resolution of the graphics pipeline by using an allocated buffer that is a fraction of a size of a buffer provided by a first anti-aliasing method and rendering to the allocated buffer at a sampling rate that is a multiple of the sampling rate used by the first anti-aliasing method. An edge in the graphics system may be a point, line, triangle or polygon edge or an edge discovered by depth buffer intersection of multiple polygons. Additional graphics criteria may also be employed to invoke full resolution multi-sample rendering.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Embodiments are generally directed to variable acuity rendering using multisample anti-aliasing, and include multi-sampling anti-aliasing circuitry that gives the impression that the rendering was performed at the native resolution of a high-resolution display device, while actually performing rendering at a significantly reduced shading resolution. A variable acuity rendering process uses an allocated buffer of a size proportional to the full (target) resolution in a multisample anti-aliasing system and renders to the allocated buffer at a rate that is increased in proportion to the reduction in buffer size, or increase in some embodiments. The allocated buffer is then expanded back to the full size to provide the full resolution available in the multisample anti-aliasing system. Such a system provides advantages over present techniques that simply render at a reduced resolution and upscale to the final target resolution.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
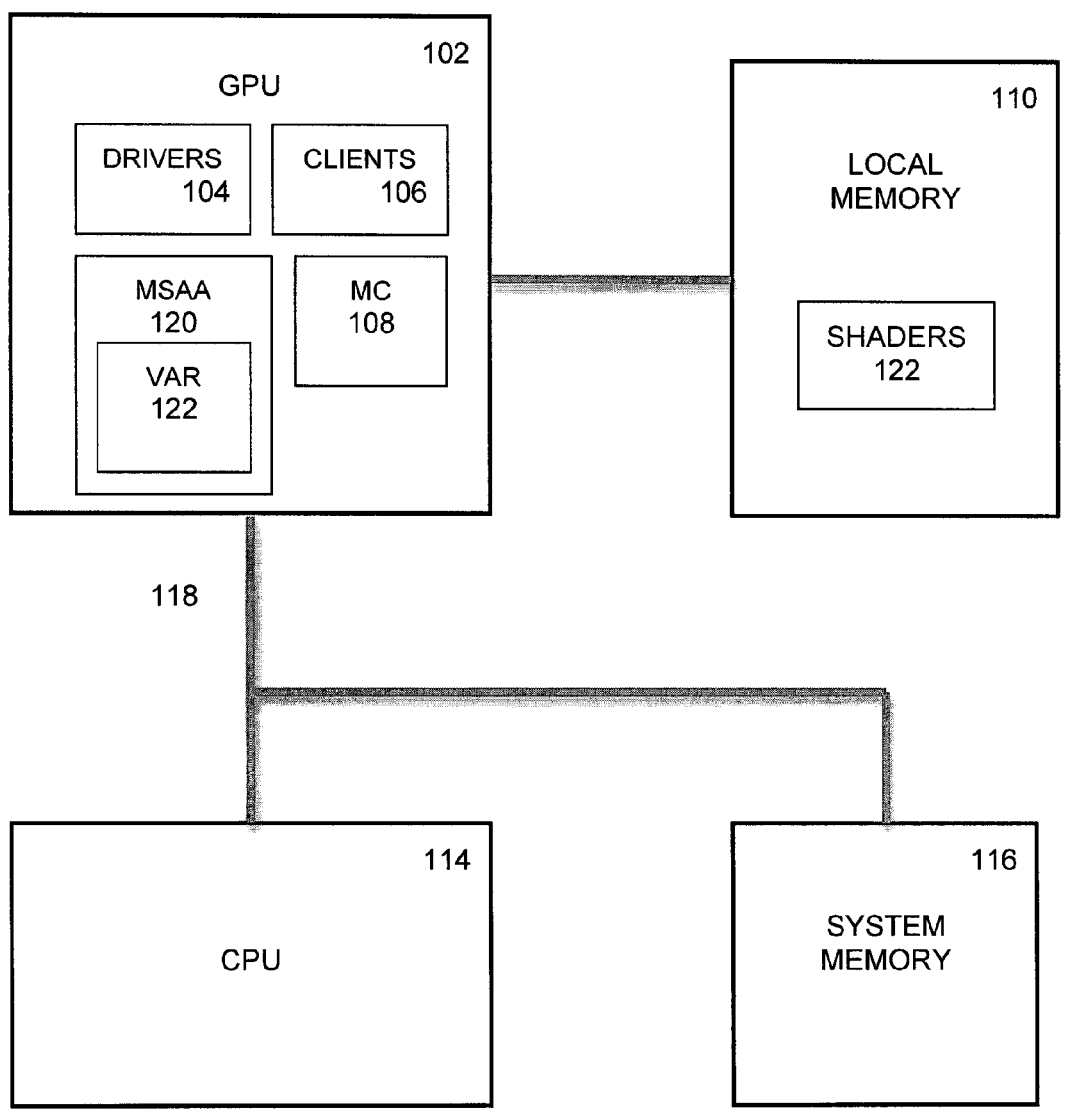
FIG. 1 is a block diagram of a graphics system that implements variable acuity rendering using multisample anti-aliasing, under some embodiments.

FIG. 1 is a block diagram of a graphics system that implements variable acuity rendering using multisample anti-aliasing, under some embodiments. Variable acuity rendering, also referred to as 'multi-resolution rendering' refers to performing an MSAA-based anti-aliasing method using different numbers of sample points per pixel on an image to perform one or more operations, such shading, coloring, rendering, or otherwise processing the image for display and using this data for higher resolution images. FIG. 1 shows an example of a system embodying some embodiments of a variable acuity system, and is not intended to be limiting. System 100 includes a graphics processing unit (GPU) 102 coupled to a central processing unit (CPU) 114. The GPU 102 is a processing unit that performs high-speed memory operations to accelerate the creation of images in a frame buffer intended for output to a display. The frame buffer is a memory structure that includes individual memory locations for each pixel of the display. The GPU 102 performs tasks related to generating 3D computer graphics such as texture mapping, rendering polygons, shading, and anti-aliasing, among other functions, and includes one or more drivers 104, a memory controller (MC) 108 and one or more clients 106. The clients 106 communicate with the memory controller 108, which controls access to a local memory 110 and a GPU-CPU bus 118. The local memory may store one or more shader programs (shaders) 122. The shaders may also or alternatively be stored locally on the GPU 102. Other rendering programs, such as color or texture functions can also be stored on local memory 110 or other components of system 100. The GPU 102 is coupled to the CPU 114 over a bus 118, which also provides a connection to system memory 116. In certain embodiments, one or more of the functions within GPU 102 may be stored on the system memory 116, or a combination of memory devices in the system. At least a portion of system 100 including GPU 102 may be referred to herein as a 'graphics pipeline.'

Under some embodiments, the GPU 102 also includes one or more components that perform multisample anti-aliasing functions 120. As shown in FIG. 1, a variable acuity rendering function (VAR) 122 is incorporated or performed by the MSAA component 120. The MSAA component can include a number of different buffers or similar memory structures to perform certain rendering tasks. The buffers can be categorized as frame buffers, depth buffers, color buffers, render buffers, and other appropriate buffers, memory or storage.

In general, the MSAA component 120 works to produce an anti-aliasing effect relatively cheaply (in terms of processor bandwidth and power use) on an image rendered using a graphics pipeline by typically performing an operation (e.g., shading) only once for each screen pixel. At geometric edges of the object, however, the operation may be performed multiple times, thus creating the anti-aliasing effect for these edges. An edge may be a point, line, triangle or polygon edge or an edge discovered by depth buffer intersection of multiple polygons. An MSAA buffer can store pixels in different modes, such as simple pixels with a single color or complex pixels with multiple color values per sample, or even hybrid modes that decouples coverage for pixel colors. In addition to color information, buffer information may be stored in multiple modes. In some embodiments, a depth buffer may generate multi-sample pixels at polygon intersections and other heuristics and overrides may generate multi-sample pixels. Edge pixels, which are typically complex pixels can be generated by edges or intersections in the depth buffer, or by other similar means.

Alternatively, the shading operation could be performed once and the coverage sample information could be used to determine the contribution to the pixel, which represents another form of MSAA optimization. For this embodiment, the MSAA sample data (samples at geometrical edges) are calculated once per pixel, rather than at each sample, and replicated to the covered samples. In some cases, this method may result in a lower quality image versus sample rate, but this effect can be alleviated by further filtering.

A further alternative embodiment is a two-phase approach in which the system first generates the MSAA data and then converts the MSAA data to the full resolution. The conversion can be done in one of several ways, such as four times resolution to four pixels, or sixteen times resolution to four pixels, with four samples, and so on.

The variable acuity rendering component 122 utilizes the principal that a multisample image can be viewed as a compressed, higher resolution version of the final image where pixels with no geometric edges are 'compressed' and expressed with a single value, but pixels with geometric edges are 'uncompressed' and contain the values for all the contributing pixels. In general, the MSAA buffer contains samples, which ultimately correspond to pixels of the high resolution image. As a representative example, consider a display device with a native resolution of 1920×1080 pixels. To shade every pixel on the screen once would represent 2,073,600 shading calculations, but to shade a half resolution buffer (e.g. 1920×540) would require only 1,036,800 shading calculations, which is a saving of 50% of the cost. If a compressed representation is one where edge pixels are shaded at full resolution, and non-edge pixels are shaded at half resolution, then, if 20% of pixels are edge pixels, the GPU would need to perform 12441600 calculations (or only 60% of the original cost). This is generally the case where the computation is performed at the sample rate at the edges. Alternatively, the system could perform the computation at the pixel rate, as stated above.

Figure 2A:
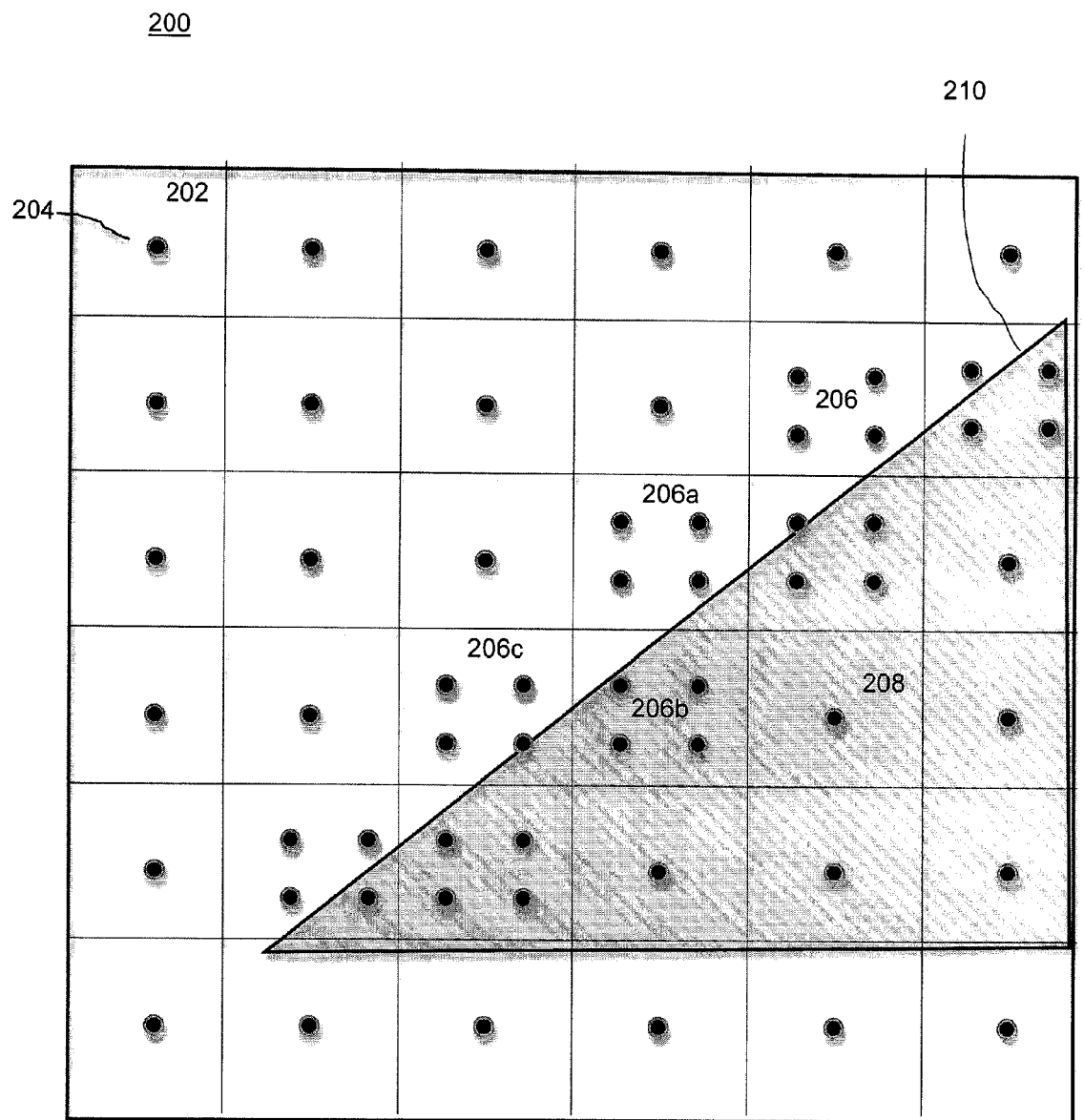
FIG. 2A illustrates a first example definition of sample points for an image using a variable acuity rendering component, under some embodiments.

FIG. 2A illustrates an example definition of sample points for an image using a variable acuity rendering component, under some embodiments. Diagram 200 illustrates the display of an image of an object 210 (image) on a display device having a number of pixels. The pixels are separated into external pixels 202 that do not contain any portion of the image, internal pixels 208 that are contained wholly within a polygon or primitive of the image, and edge pixels 206 that contain at least a portion of a border or edge of the image. In an embodiment, non-edge pixels can be calculated at the sample rate or stored at the sample rate, but are calculated at the pixel rate to make the process more computationally efficient.

With reference to FIG. 2A, the MSAA function defines one or more sample points 204 per pixel. In some embodiments, exterior 202 and interior 208 pixels contain only a single sample point. This sample point is used to define the appropriate rendering characteristic(s) of the pixel based on the image, such as the color, shade, texture, and so on. Edge pixels 206 have n sampling points, where n>1, and is typically any practical number between 2 and 16 depending on the complexity and capabilities of the system. For the example shown in FIG. 2A, four sampling points provided in a regular grid pattern for each edge pixel 206. The pixel value for a particular rendering characteristic is generally taken as the average of the values at each sampling point within the pixel. Thus, as shown in FIG. 2A, pixel 206a has about 20% coverage, pixel 206b has about 75% coverage and pixel 206c has about 25% coverage based on the amount of image contained in each of these respective pixels. The internal pixels 208 have 100% or substantially 100% coverage, and the external pixels 202 have 0% or substantially 0% coverage. This proportion information can be determined using the appropriate number and distribution of sample points within the pixels, and can be used to provide a proportionate amount of shading, coloration, texture, etc. to the displayed image. This produces the effect that the edges of the image fade out as less of the object is contained in an edge pixel, thus eliminating the abrupt jagged edge due to the pixel being either entirely covered by the object or not covered by the object.

Figure 2B:
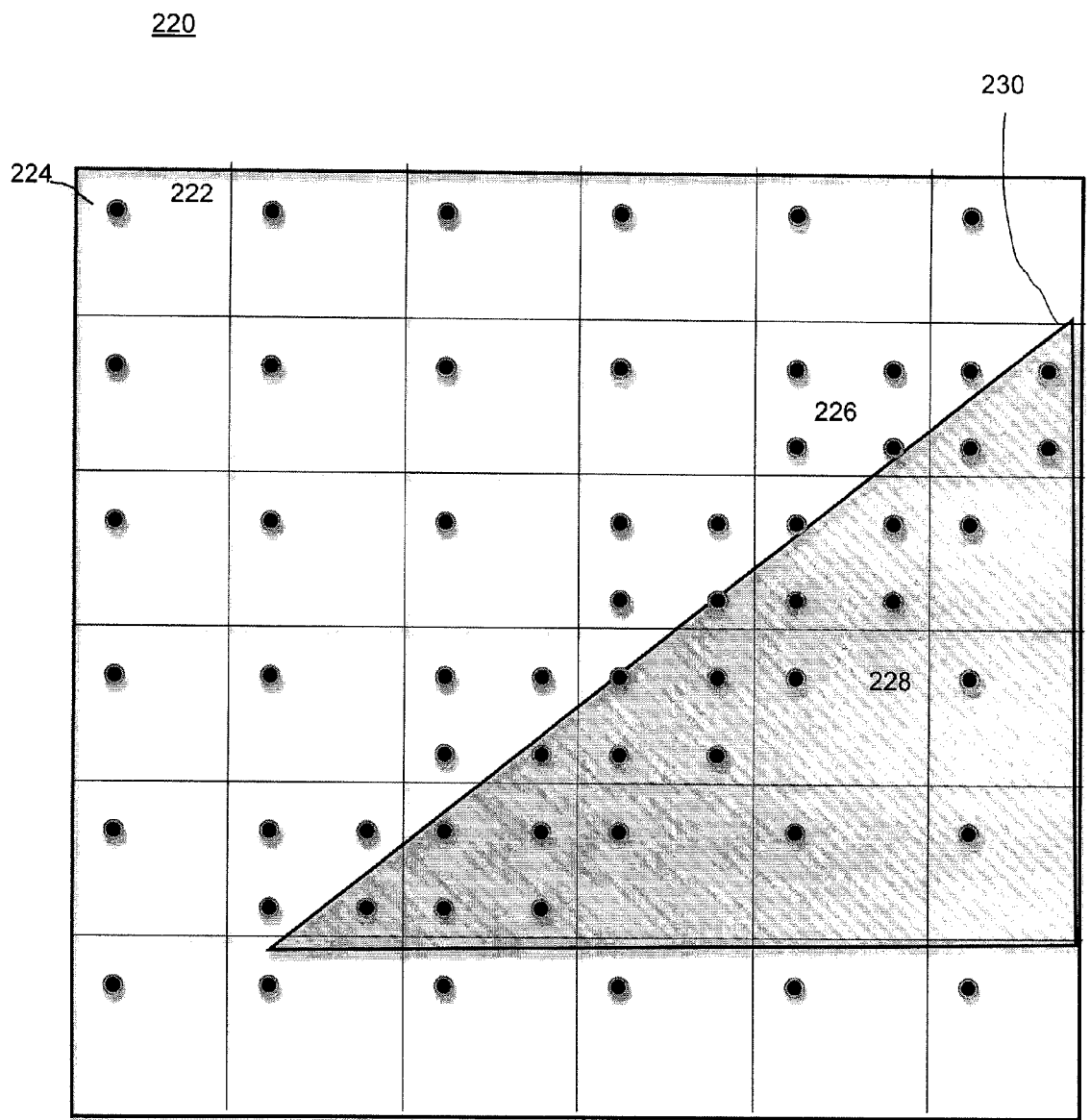
FIG. 2B illustrates a second example definition of sample points for an image using a variable acuity rendering component, under some embodiments.

As shown in FIG. 2A, the single sample points 204 are located substantially in the center of a pixel 202. Alternatively, the single sample point location can be coincident with the location of one of the supersample locations in a complex pixel. FIG. 2B illustrates another example definition of sample points for an image using a variable acuity rendering component, under some embodiments. In diagram 220, complex pixels 226 that contain the edge portion of image 230 contain four supersample points arranged in a particular grid pattern and spacing. Internal pixels 228 and external pixels 222 have a single sample point that is coincident with one of the supersample point locations. In the example of FIG. 2B, the location of the single sample point corresponds to the location of the upper left sample point for a complex pixel, though any of the other three locations could have been used instead.

It should be noted that FIGS. 2A and 2B are intended to be example illustrations only and that various different configurations of sample points in a display may be possible. The example of FIG. 2A illustrates a case where the sample placement for edge pixels conforms to a regular grid pattern of 2×2 sample points for each edge pixel. Alternatively, other grid patterns may be used for pixels with more than one sample point, such as sparse regular grid, random distribution, Poisson distribution, rotated grid, and so on. Likewise, the grid spacing may be different and the position of sample points for internal and external pixels can be in various different locations within a pixel, as shown in FIG. 2B.

Because the image 210 is sampled using a number of sample points for at least some of the pixels containing portions of the image, it is referred to as a 'multisample image.' As stated above, the variable acuity rendering component 122 treats the multisample image as a compressed, higher resolution version of the final image. The exterior 202 and interior 208 pixels with no geometric edges are compressed and expressed with a single value, and the edge pixels 206 are 'uncompressed' and contain the values for all the contributing sample points.

The VAR component produces a compressed representation where edge pixels are shaded (or otherwise processed) at full resolution, and non-edge pixels are shaded at partial resolution (e.g., half resolution, or other percentage). In some embodiments, one or more of the buffers of the MSAA, such as an MSAA frame buffer is used by the VAR component 122. The VAR process uses an existing MSAA buffer and allocates a buffer or portion of memory (e.g., full width, half height buffer) to render the image using MSAA techniques. It also enables a multisampling rate based on the size of the allocated buffer for the sample. For example, if a half-height buffer is used, a two-times (2×) multisampling rate is enabled. In this case, the samples can be positioned spaced at half-pixel offsets vertically. The buffer is then rendered as normal with multisampling enabled, and when it is time to display the buffer, the buffer is then expanded to the full original resolution by essentially expanding the buffer back to the original size of the original existing MSAA buffer.

Figure 3:
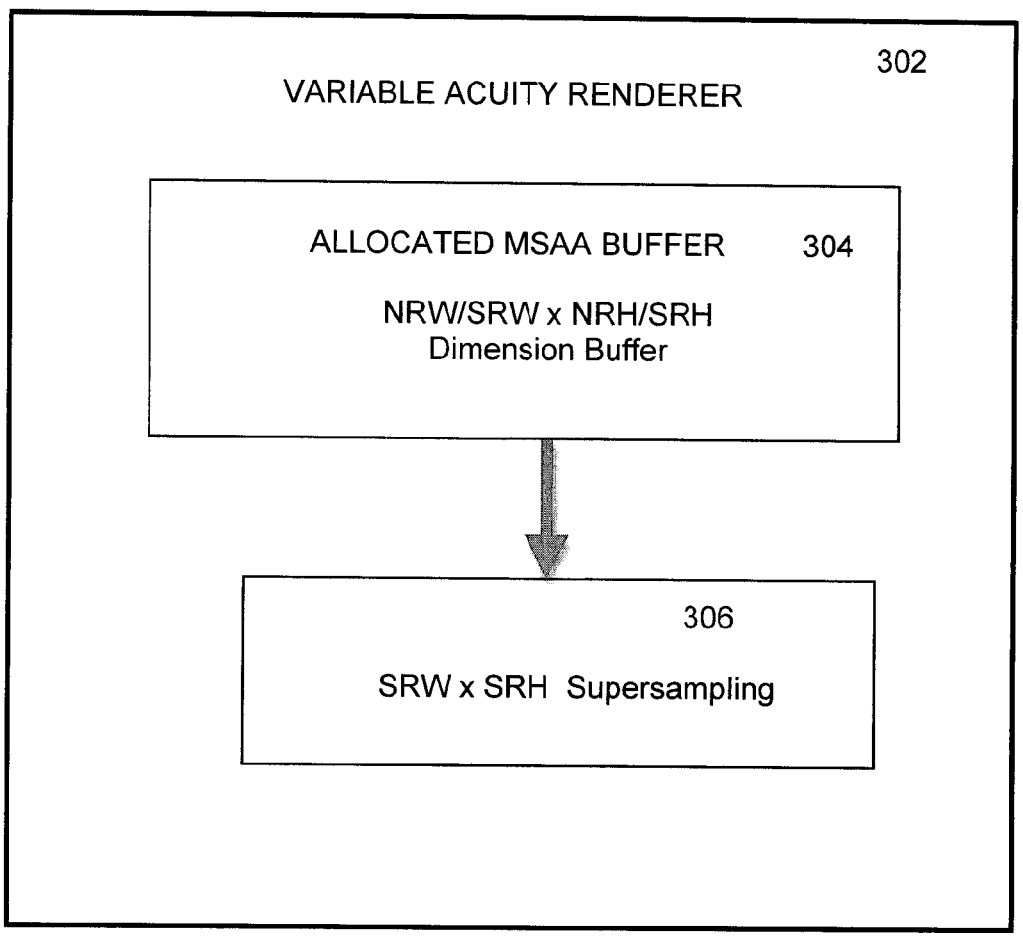
FIG. 3 illustrates some functional components of a variable acuity rendering component, under some embodiments.

FIG. 3 illustrates some functional components of a variable acuity rendering component, under some embodiments. As shown in diagram 300, the variable acuity rendering component 302 uses an allocated buffer from one or more existing MSAA buffers provided by the GPU pipeline. To provide the compression effect, the allocated buffer is a reduced-size version of the full existing buffer and is used by the VAR component. If the original size of the buffer has a width and height dimension defined by a native resolution of the system, the dimensions of this original buffer can be denoted as having a width×height of native_resolution_width (NRW) by native_resolution_height (NRH). The allocated buffer modifies this native resolution size and width by the sample rate. Thus, in an embodiment, the allocated buffer is configured to have a width dimension of the native_resolution_width (NRW) divided by the sample_rate_width (SRW), and a height dimension of the native_resolution_height (NRH) divided by the sample_rate_height (SRH), where the unit of each dimension is expressed in pixels.

Once the relative buffer size is allocated, a supersampling operation 306 is performed at a rate proportional to the size of the allocated buffer. As shown in diagram 300, if the allocated buffer is of dimension NRW/SRW by NRH/SRH, the sampling is performed at a rate of SRW×SRH. Thus, for example, for a ½ height, ½ width buffer, sampling is performed at a 4×MSAA rate. Many other allocated buffer sizing schemes are also possible. For example, different sampling rates could be performed by allocating a full-width, ¼ height buffer; or a ½ width, ½ height buffer; a ½ width, ¼ height buffer, or a ¼ width, ½ height buffer, and so on. In this manner, anisotropic or isotropic sampling and scaling patterns may be used. A full resolution image scaled up from a reduced resolution multisample image may or may not still contain filtered multisample information.

The operation of component 300 could be expressed as follows in an example embodiment:

Original MSAA Buffer Dimension:
native_resolution_width × native_resolution_height
NRW × NRH
Allocated Buffer Dimension:
native_resolution_width/sample_rate_width ×
native_resolution_height/sample_rate_height -continued

```
NRW/SRW × NRH/SRH
Supersample Rate:
sample_rate_width × sample_rate_height
SRW × SRH
```

Figure 4:
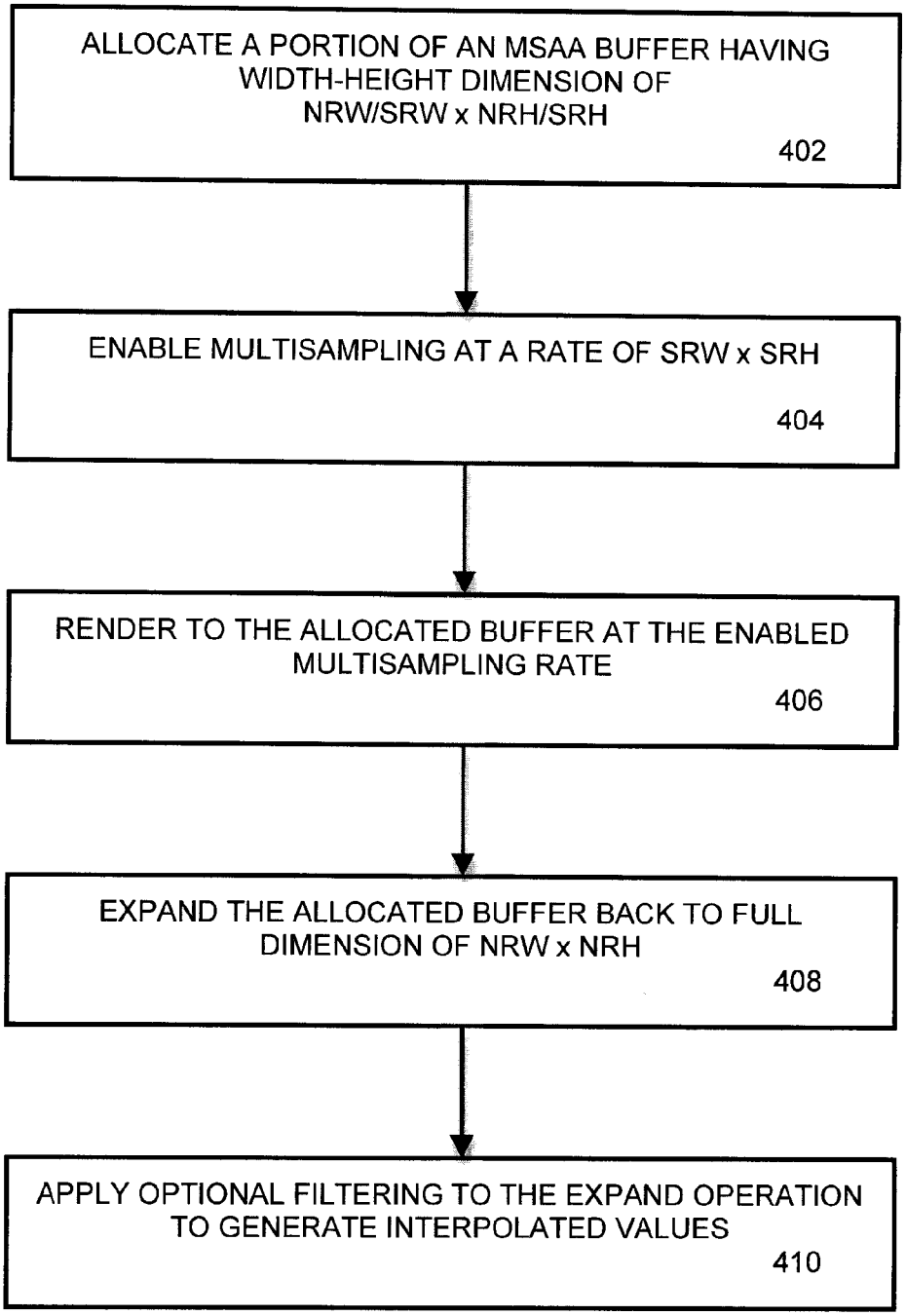
FIG. 4 is a flowchart illustrating a variable acuity rendering method, under some embodiments.

FIG. 4 is a flowchart illustrating a variable acuity rendering method, under some embodiments. As shown in flowchart 400, the process begins with the allocation of a buffer or portion of an available MSAA buffer having a dimension of NRW/SRW×NRH/SRH relative to the MSAA buffer having an original dimension of NRW×NRH, act 402. For the VAR process, the MSAA sampling rate is then enabled at a higher rate of SRW×SRH times the original MSAA sampling rate, where the higher rate is directly proportional to the reduction in size of the original MSAA buffer, act 404. The image is then rendered to the allocated buffer at the enabled multisampling rate, act 406. The allocated buffer is then expanded from the reduced dimension back to the full original MSAA buffer size, act 408. This process thus allows the rendering of the image at a lower resolution (as determined by the reduction in the MSAA buffer size) but mimics processing at a higher rate by rendering at a modified MSAA rate and the expanding the allocated buffer back to the full buffer size. It should be noted that the expansion back to full buffer size may occur in situ to the original buffer at no cost of additional space depending on the multi-sample storage regime.

In an example implementation, the VAR process uses an existing MSAA buffer and allocates a full width but half height buffer to the modified anti-aliasing process. The existing MSAA buffer is referred to as the high-resolution (high res) buffer and the allocated buffer is referred to as the low-resolution (low res) buffer. For this example, the VAR process also enables two-time (2×) multisampling for this sample, with the samples positioned spaced at half-pixel offsets vertically. The buffer is rendered at this rate and the buffer is then expanded to the full original resolution. In the example programming code segment shown below, 'sample0' refers to the upper sample and 'sample1' refers to the lower sample in each pixel in the low-res buffer. A simple expand operation to convert the low-res buffer into the high-res buffer could be expressed as follows in example programming code for a shading operation:

```
For each(pixel in low res buffer(x,y))
{
    If(pixel has only one shading sample)
    {
        // Interior pixel - replicate vertically
        HighResBuffer(x,(y*2)) = LowResBuffer(x,y).sample0;
        HighResBuffer(x, (y*2)+1) = LowResBuffer(x,y).sample0;
    }
    Else
        // Exterior pixel - extract full resolution edge
        information from multisample buffer
        HighResBuffer(x,(y*2)) = LowResBuffer(x,y).sample0;
        HighResBuffer(x, (y*2)+1) = LowResBuffer(x,y).sample1
    }
}
```

The end result of this operation is a native resolution buffer with edges apparently at the full resolution, but shading (or other processing) performed at only half resolution vertically.

As shown in FIG. 4, it is possible to enhance this scheme further by applying some filtering during the expand operation on the internal pixels to generate unique interpolated shading values for each pixel in the high resolution image, act 410. For example, filters such as bilinear or bicubic expansion or "reconstruction" filters may be used to blend adjacent super sample information. Such filtering generally provides a smoother result and reduces or eliminates blocky artifacts. An example filter is one that performs a method like a linear interpolation scheme, as illustrated in the following example programming code segment:

```
If(pixel has only one shading sample)
{
    // Interior pixel - interpolate shading vertically
    HighResBuffer(x,(y*2)) = LowResBuffer(x,y).sample0;
    HighResBuffer(x, (y*2)+1) = (LowResBuffer(x,y).sample0 +
    LowResBuffer(x,y+1).sample0) /2
}
```

More complicated reconstruction schemes could be used for both the internal and edge pixels, if desired. The scheme described in the example case above reduces shading frequency by two times. In some embodiments, the VAR component can be configured to reduce the shading frequency by higher ratios. For example, running 4×MSAA makes it possible to downscale the buffer by two times, i.e., halving the size in both the width and height dimensions. This retains high resolution edges, but reduces shading frequency by four times. Similarly, 8×MSAA could be used to reduce shading frequency by eight times if the reduction is along one axis (i.e., width or height) of the buffer. In general, the sample rate frequency change is the square root of the sample pattern for isotropic sample pattern, so 16×MSAA equals 4× frequency change on two axes (i.e., width and height), and so on.

In some embodiments, flexible ratios of reduction in the shading frequency may be provided. For example, the VAR component could choose to selectively supersample some of the objects in the reduced resolution image. This would have the effect of rendering the shading for those objects at native frequency, or an increased fraction of native frequency.

In some embodiments, the VAR component is configured to vary the level of multisampling dynamically as the process is run (i.e., 'on the fly') to respond to changes in the workload or the system. For example, changes in the global power environment such as someone unplugging an external power supply might result in the system deciding to switch to a lower frequency for the shading calculations to save power.

In some embodiments, the expansion or reconstruction of the high resolution buffer from the lower resolution MSAA buffer could be performed by shader code (or other function code), by a specialized data transfer unit, or by the display hardware. In the case of using the display hardware, in certain cases the display hardware may need to be modified to understand the compressed MSAA buffer representation.

Some embodiments are directed to modified multi-sample rendering techniques that support and mitigate increased pixel fill performance and power requirements of high-density (e.g., Retina-class) displays. As opposed to techniques where multi-samples in a pixel are normally resolved to a single pixel during scan out, individual subsamples or groups of subsamples are instead produced and sent to video at supersample resolution, and non multi-sample pixels are upsampled with a reconstruction filter as they are sent to the video buffer or other temporary storage.

The multisample fragment information in the frame buffer is resolved at video scanout time to produce supersamples, which are sent out as pixels for any frame buffer pixels that have been promoted during rendering to include multi-sample information. Samples that have no super-sample information are upsampled to video using a magnifying reconstruction filter applied to produce a higher resolution image. The result is a video representation with variable resolution information including more detailed pixels at the native hardware display resolution where the rendered content generates it through polygon edges, depth intersection and texture and shader enhancement.

In some embodiments, the multisample resolve to super-sampled enhanced resolution video mixed with upsampled reconstructed video can occur during a video scan out, such as during a swap buffers operation or during a rendered window manager composite phase. The VAR process includes the ability to store a frame buffer and copy a frame buffer to preserve multisample information and to texture with multisample buffers in a composite stage. For example, a line buffer or tile buffer may be used in some embodiments for the MSAA resolve and upsample transfer to video.

Multisample information could also be anti-aliased, for example a 2×2 (4×MSAA) could be resolved to 4 pixels during scan-out, but a 4×4 (16×MSAA) arrangement could be promoted to 4 pixels, each of which has four-sample anti-aliasing. Additionally, a 16×MSAA scheme could be supported at polygon edges and promoted to 2×2 pixels with 4×MSAA. In this case, other scene information such as textures of lower contrast could simply be rasterized as 4×MSAA and promoted to 2×2 pixels without further multisampling.

In a typical implementation, the VAR process generally permits multi-resolution processing utilizing existing GPU pipeline hardware, and specifically existing MSAA buffers. It provides advantages in both performance and power draw compared to rendering at native resolutions, while providing many of the advantages of the original native resolution rendering, and a potentially significantly better visual appearance than existing solutions. Thus, certain embodiments are directed to repurposing existing hardware to perform rendering at the native resolution of a display device, such as a new generation high-resolution device, while performing shading operations at a reduced resolution to save power and increase performance and enhance visual quality while supporting emerging technologies using existing designs.

Some embodiments are directed to multisampling anti-aliasing circuitry that gives the impression that the rendering was performed at the native resolution, while actually performing rendering at a significantly reduced shading precision. This overcomes the disadvantages of present techniques that involve simply rendering at reduced resolution and upscaling to the final target resolution and that are susceptible to scaling artifact problems. These embodiments also provide an optimization opportunity for graphics hardware optimization that meets the resolution requirements but does not impose an added pixel fill burden uniformly over the screen.

For purposes of the present description, the terms "component," "module," "unit," "circuit," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method as shown in FIG. 4.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. The detailed description is thus intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for rendering a graphics image, comprising:
   allocating a buffer used in a multisample anti-aliasing process, wherein a size of the allocated buffer comprises a reduction in at least one of the width or height of a dimension of an original buffer;
   rendering sampled image data to the allocated buffer at an increased sampling rate proportional to the reduction; and
   expanding the allocated buffer back to the dimension of the original buffer, wherein the image comprises one or more objects displayed by pixels on a display having a native resolution, wherein the object comprises an outline enclosing an area, and wherein the image comprises a plurality of edge pixels containing at least a portion of the outline and a plurality of internal pixels containing at least a portion of the area, and wherein the edge pixels comprises a polygon edge discovered by depth buffer intersection of multiple polygons;
   wherein the dimension of the original buffer comprises a width based on the native resolution and a height based on the native resolution, and further wherein the dimensions of the allocated buffer comprises a width corresponding to the native resolution width divided by a width based on the increased sample rate, and a height corresponding to the native resolution height divided by a height based on the increased sample rate.

2. The method of claim 1 further comprising:
   rendering the image through a graphics processing circuit using the multisample anti-aliasing process; and
   performing a rendering operation using the allocated buffer to modify a characteristic of the image displayed by at least some of the plurality of edge pixels or internal pixels.

3. The method of claim 2 wherein the rendering operation is one of shading or coloring of the image, and wherein the original buffer is associated with the rendering operation by the multisample anti-aliasing process and is provided as part of the graphics processing circuit.

4. The method of claim 2 wherein expanding the allocated buffer back to the dimension of the original buffer comprises executing shader code in a shader unit of the graphics processing circuit.

5. The method of claim 4 further comprising applying a filter function during the expanding act on one or more internal pixels to generate interpolated values for the one or more internal pixels in the rendered image.

6. The method of claim 1 further comprising generating a plurality of samples for each edge pixel, wherein the plurality of samples are arranged in each pixel in a pattern defined by one of: a regular grid, a Poisson distribution, a random grid, and a rotated grid.

7. The method of claim 1 further comprising:
rendering the graphics image using a frame buffer, wherein the frame buffer has multisample fragment information for pixels that are promoted during rendering to include multi-sample information;
resolving the multisample fragment information during a scanout time to produce supersample data for the promoted pixels; and
upsampling pixel data for pixels that do not include multi-sample information using a magnifying reconstruction filter.

8. A method for anti-aliasing a graphics image, comprising:
identifying an edge portion of the graphics image comprising edge pixels that are distinct from internal pixels comprising an internal portion of the graphics image;
performing a rendering operation of the edge pixels at a full resolution of a graphics pipeline rendering the graphics image; and
performing the rendering operation of the internal pixels at a fraction of the full resolution of the graphics pipeline, using an allocated buffer that is a fraction of a size of a buffer provided by a first anti-aliasing method and rendering to the allocated buffer at a sampling rate that is a multiple of the sampling rate used by the first anti-aliasing method,
wherein the graphics image comprises an object displayed by pixels on a display having a native resolution, wherein the object comprises an outline enclosing an area, and further wherein the image comprises a plurality of edge pixels containing at least a portion of the outline and a plurality of internal pixels containing at least a portion of the area, and yet further wherein the edge pixels comprises a polygon edge discovered by depth buffer intersection of multiple polygons; and
wherein the graphics pipeline includes a multisampling anti-aliasing component comprising the buffer associated with the rendering operation, and wherein the dimension of an original buffer comprises a width based on a native resolution of a display device coupled to the graphics pipeline, and a height based on the native resolution; and further wherein the dimensions of the allocated buffer comprises a width corresponding to the native resolution width divided by a width based on the sampling rate, and a height corresponding to the native resolution height divided by a height based on the sampling rate.

9. The method of claim 8 wherein the rendering operation is one of shading or coloring of the graphics image.

10. The method of claim 9 wherein the first anti-aliasing uses one of a supersample or multisample method for defining a plurality of sample points for at least some of the pixels on the display.

11. The method of claim 8 further comprising expanding the allocated buffer back to the dimension of the original buffer.

12. An apparatus for anti-aliasing an image to be rendered to a digital display, comprising:
an allocated buffer comprising at least part of an original buffer used in a multisample anti-aliasing process, wherein a size of the allocated buffer comprises a reduction in at least one of the width or height of a dimension of the original buffer; and
a rendering component rendering sampled image data to the allocated buffer at a sampling rate proportional to the reduction, wherein the image comprises one or more objects displayed by pixels on a display having a native resolution, wherein the object comprises an outline enclosing an area, and further wherein the image comprises a plurality of edge pixels containing at least a portion of the outline and a plurality of internal pixels containing at least a portion of the area, and yet further wherein the edge pixels comprises a polygon edge discovered by depth buffer intersection of multiple polygons;
wherein the dimension of the original buffer comprises a width based on the native resolution and a height based on the native resolution, and further wherein the dimensions of the allocated buffer comprises a width corresponding to the native resolution width divided by a width based on the increased sample rate, and a height corresponding to the native resolution height divided by a height based on the increased sample rate.

13. The apparatus of claim 12 further comprising an expansion component expanding the allocated buffer back to the dimension of the original buffer.

14. The apparatus of claim 13 wherein the image comprises an object displayed by pixels on the display having a native resolution, wherein the object comprises an outline enclosing an area, and wherein the image comprises a plurality of edge pixels containing at least a portion of the outline and a plurality of internal pixels containing at least a portion of the area.

15. The apparatus of claim 14 wherein the rendering component is part of a graphics processing circuit that renders the image through a the anti-aliasing process by performing a rendering operation using the allocated buffer to modify a characteristic of the image displayed by at least some of the plurality of edge pixels or internal pixels, and wherein the rendering operation is one of shading or coloring of the image.

16. The apparatus of claim 15 further comprising a sampling component generating a plurality of samples for each edge pixel, wherein the plurality of samples are arranged in each pixel in a pattern defined by one of: a regular grid, a Poisson distribution, a random grid, and a rotated grid.

* * * * *